United States Patent Office 3,523,129
Patented Aug. 4, 1970

3,523,129
METHOD OF MAKING ALUMINUM CHLOROHYDROXIDE COMPLEXES
James M. Holbert, Lookout Mountain, and Stewart M. Beekman, Signal Mountain, Tenn., and Horst W. Schmank, Ringgold, Ga., assignors to Chattem Chemicals, Division of Chattem Drug & Chemical Company, Chattanooga, Tenn., a corporation of Tennessee
No Drawing. Continuation-in-part of application Ser. No. 527,077, Feb. 14, 1966. This application Oct. 24, 1967, Ser. No. 677,780
Int. Cl. C07f 5/06; A61k 7/00; C01b 7/48
U.S. Cl. 260—448                                  6 Claims

ABSTRACT OF THE DISCLOSURE

Anti-perspirant aerosol composition prepared by reacting an aluminum chlorhydroxide complex with metallic aluminum in controlled amounts of water to produce an anti-perspirant which is less corrosive and more effective than the starting material.

CROSS REFERENCE TO RELATED APPLICATION

This application is a continuation-in-part of our copending application Ser. No. 527,077 filed Feb. 14, 1966.

BACKGROUND OF THE INVENTION

Field of the invention

The invention relates to the field of anti-perspirant compositions in aerosol form, the active ingredients of the composition being an aluminum chlorhydroxide complex having the following empirical monomeric formula:

(1) 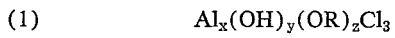 $Al_x(OH)_y(OR)_zCl_3$ where $x$ is an integer from 3 to 6, $y+z=3x-3$, $y$ is greater than $x$, and $z$ is an integer from 0 to 6, the OR groups, when present, being selected from the group consisting of isopropoxy groups, ethoxy groups, and mixtures of isopropoxy and ethoxy groups.

The active ingredient of the anti-perspirant composition is prepared by reacting an aluminum chlorhydroxide complex with metallic aluminum and controlled amounts of water under reflux conditions to produce the desired complex.

The active ingredient is then dissolved in a substantially anhydrous solvent for the complex, the solvent containing a major proportion of ethanol. The ethanol solution is then combined with a liquid propellant forming under pressure a homogeneous solution with a substantially anhydrous ethanol solution.

Description of the prior art

Aluminum chloride hexahydrate has been used as an anti-perspirant composition for a long time. Although it is compatible with anhydrous ethanol, compatible with propellants, and is an effective anhydrotic, it is too acid to use daily, and has adversely affected the tensile strength of fabrics.

Aluminum phenolsulphonate has been used as an anti-perspirant composition, and continues to be used. Its anti-perspirant activity, however, is quite low.

In U.S. Pat. No. 2,823,169, there is a disclosure of the use of aluminum chlorhydroxide alcoholates having 0.25 to 1 hydroxyl for each aluminum atom in anti-perspirant compositions. These materials, however, are rather unstable. What is more, they contain more than a trace amount of iron, usually on the order of 40 to 80 parts per million. Iron inactivates compounds such as hexachlorophene and also catalyzes degradation of some organic perfume materials.

U.S. Pat. No. 2,872,379 discloses a series of alkoxy aluminum chlorides, but these compounds are limited in usefulness because of their very low solubility in anhydrous or absolute ethanol.

Canadian Pat. No. 718,932 discloses aerosol compositions prepared by reacting an aluminum compound such as a chlorhydroxide with an alcohol having at least two hydroxy groups or a glycol monoether.

SUMMARY OF THE INVENTION

In our copending application Ser. No. 527,077, we have described a series of aluminum chlorhydroxide complexes which have significantly improved anti-perspirant activity, which are stable in the presence of anhydrous ethanol, and form homogeneous systems with conventional propellants.

We have now found that the properties of the compounds of the parent application can be even further improved in the matter of improved odor, better skin feel to evaporated aerosol residues, higher aluminum content, ease of formulation and economy of manufacture by reacting the products of the aforementioned application with additional amounts of metallic aluminum and controlled amounts of water. The reactions are carried out under refluxing conditions and then the reaction product is dissolved in a solvent consisting principally of ethanol although amounts of isopropanol up to about 20% by weight of ethanol present can be tolerated. The resulting solution is completely compatible with conventional propellants and is substantially non-corrosive to metal valves in aerosol dispensers.

DESCRIPTION OF THE PREFERRED EMBODIMENTS

Using the nomenclature previously used, the starting materials of the present invention have the following empirical monomeric formula:

(2) 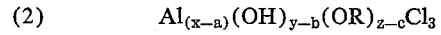 $Al_{(x-a)}(OH)_{y-b}(OR)_{z-c}Cl_3$

The formula given above is for the monomer of the starting material, recognizing that complexes of this type have a tendency to polymerize and form loosely bonded polymers.

The starting material of the formula given above is then reacted with (a) molecular proportions of metallic aluminum, (b) molecular proportions of water and, optionally, (c) molecular proportions of a lower alcohol such as ethanol or isopropanol or mixtures of the two.

In the preferred embodiment of the invention, the starting material and the final complex are devoid of alkoxy groups so that $z$ and $c$ in the formulas given above are both 0.

The following equations illustrate some of the many complexes which can be produced according to the process of the present invention:

(3) 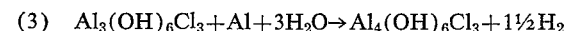 $Al_3(OH)_6Cl_3 + Al + 3H_2O \rightarrow Al_4(OH)_6Cl_3 + 1\frac{1}{2}H_2$

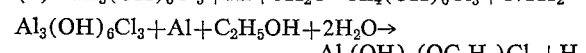 $Al_3(OH)_6Cl_3 + Al + C_2H_5OH + 2H_2O \rightarrow Al_(OH)_8(OC_2H_5)Cl_3 + H_2$

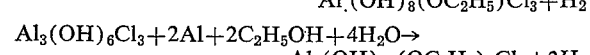 $Al_3(OH)_6Cl_3 + 2Al + 2C_2H_5OH + 4H_2O \rightarrow Al_5(OH)_{10}(OC_2H_5)_2Cl_3 + 3H_2$

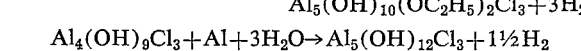 $Al_4(OH)_9Cl_3 + Al + 3H_2O \rightarrow Al_5(OH)_{12}Cl_3 + 1\frac{1}{2}H_2$

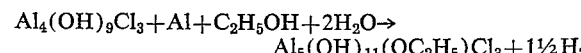 $Al_4(OH)_9Cl_3 + Al + C_2H_5OH + 2H_2O \rightarrow Al_5(OH)_{11}(OC_2H_5)Cl_3 + 1\frac{1}{2}H_2$

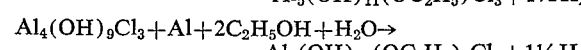 $Al_4(OH)_9Cl_3 + Al + 2C_2H_5OH + H_2O \rightarrow Al_5(OH)_{10}(OC_2H_5)_2Cl_3 + 1\frac{1}{2}H_2$ The following specific examples illustrate the preparation of some of the complexes coming under the present invention. Other species can, of course, be produced in the same manner with appropriate changes in ingredients.

Example 1

The complex $Al_3(OH)_6Cl_3$ was prepared in the following way. Anhydrous ethanol (at least 99% by weight ethanol) in an amount of 1500 grams was placed in a 4 liter resin reaction kettle equipped with an efficient stirrer, condenser, and a partial heating mantle. Aluminum chloride hexahydrate in the amount of 724 grams was added in the form of purified crystals. The temperature was brought up to aproximately 78° C. which was the reflux temperature, while the mixture was stirred rather vigorously. When solution was complete (in approximately 1½ hours), 1225 grams of liquid aluminum isopropoxide was added over a period of approximately 30 minutes. Heating and agitation was continued for 24 hours. After the reaction was complete, sufficient alcohol (approximately 1725 grams) was removed by evaporation under reduced pressure to remove about 50% of the total batch weight as the mixture of ethanol and isopropyl alcohol. The batch was then made up to the total original weight of 3500 grams of anhydrous ethanol, and the solution thoroughly mixed.

Example 2

Preparation of $Al_4(OH)_9Cl_3$.—The aluminum chlorhydroxide complex produced according to Example 1, in an amount of 2500 grams of a 25% solution in ethanol and isopropanol was added to a 4 liter reaction kettle with a heating mantle, condenser, and efficient agitator as in Example 1. Finely divided aluminum powder in an amount of 130 grams was added and the batch was heated to reflux temperature. The amount is about 120% more than is required to form the complex $Al_4(OH)_9Cl_3$.

After the initial reaction has subsided, 117 grams of water dissolved in 680 grams of anhydrous ethanol were added dropwise under conditions of agitation and at reflux temperature. Evolved hydrogen gas was allowed to leave the system. Refluxed alcohol was returned to the reaction after condensation. The reaction was continued until 58.5 grams of the aluminum metal had been consumed. This required 5 to 8 hours. The progress of the reaction was monitored by filtering a small cooled volume through a Buchner funnel fitted with a retentive paper, washing the residual aluminum with ethanol, drying, and weighing of the unreacted aluminum. After the reaction was complete, the reaction mixture was cooled to 35–40° C. and filtered through an asbestos pad in a Buchner funnel using a moderate vacuum. The filtered clear solution amounted to 3190 grams.

Example 3

Preparation of $Al_5(OH)_{12}Cl_3$.—A 25 weight percent ethanol and isopropanol solution of the complex produced according to Example 1 in an amount of 2250 grams was added to a 4 liter resin kettle equipped with a stirrer, condenser, and heating mantle. The temperature was raised to reflux temperature (about 79° C.) and 170 grams of aluminum powder was added. After the initial reaction subsided, 212 grams of water in 1000 grams ethanol was added gradually over 2 to 5 hours. Reaction was carried out at reflux temperatures. After 106 grams of the aluminum powder had reacted, the batch was cooled and filtered through an asbestos-cellulose pad using a Buchner funnel and a mild vacuum (10 to 20 inches of mercury). The progress of the reaction was monitored as previously to determine the residual aluminum. The reaction product consisted of a clear, slightly amber filtrate.

Example 4

Preparation of $Al_5(OH)_9(OC_2H_5)_3Cl_3$.—A 25 weight percent ethanol and isopropanol solution of the complex produced according to Example 1, in an amount of 2250 grams was added to a 4 liter Pyrex resin kettle provided with an efficient stirrer through a ground glass joint, a water cooled condenser, and an electric heating mantle.

Heat was applied to raise the temperature to the reflux point of about 79° C. while the agitator was in operation. This required about 15 minutes.

Finely divided aluminum metal in an amount of 170 grams was added to the refluxing solution. When the reaction commenced, the external heat was turned off. After about 30 minutes, 30 grams of water in 250 ml. of anhydrous ethanol was added. Additional water-alcohol increments were added periodically over a 3 to 5 hour period until a total of 106 grams of water and 1000 grams of anhydrous ethanol were added. The mixture was allowed to reflux for about 1 hour after the final alcohol-water mixture was added.

The batch was allowed to cool and filter through an asbestos-cellulose pad using a Buchner funnel with moderate vacuum. The final solution was assayed for aluminum content.

The anti-perspirant compositions of the present invention can be sold as concentrates containing 15 to 40 percent by weight of the complex in anhydrous ethanol, with 25 to 30 percent by weight being preferred.

In the manufacture of the aerosol composition, about 10 to 40% by weight of the concentrate (25% solids concentration) can be combined with 20 to 50% by weight of anhydrous alcohol, and the balance being a mixture of propellants such as fluorocarbons. The relative amounts of the reaction product and the propellants can be varied depending upon the viscosity of the reaction product, the size of the valve, and the aerosol dispenser, and similar factors.

It should be evident that various modifications can be made to the described embodiments without departing from the scope of the present invention.

We claim as our invention:

1. The method of making an anti-perspirant compound having the empirical monomeric formula $$Al_x(OH)_y(OR)_zCl_3$$

where $x$ is an integer from 4 to 6, $y+z=3x-3$, $y$ is greater than $x$, and $z$ is an integer from 0 to 6, the OR groups, when present, being selected from the group consisting of isopropoxy groups, ethoxy groups and mixtures of isopropoxy and ethoxy groups which comprises reacting an aluminum compound having the above empirical formula in which $z$ is 0 and having at least three aluminum atoms with metallic aluminum, water, and an alcohol selected from the group consisting of ethanol, isopropanol, and mixtures thereof under reflux conditions, the amounts of said aluminum, water, and alcohol being sufficient to produce a compound having said empirical formula but having a higher ratio of aluminum atoms to chloride than exists in the starting material.

2. The method of claim 1 in which the starting aluminum compound has the formula $Al_3(OH)_6Cl_3$.

3. The method of claim 1 in which the starting aluminum compound has the formula $Al_4(OH)_9Cl_3$.

4. The method of making an anti-perspirant compound having the empirical monomeric formula $$Al_x(OH)_yCl_3$$

where $x$ is an integer from 4 to 6 and $y=3x-3$ which comprises reacting an aluminum compound having the same empirical formula but with at least three aluminum atoms with metallic aluminum, water, and an alcohol selected from the group consisting of ethanol and isopropanol under reflux conditions, the amounts of metallic aluminum and water present being sufficient to produce a compound having the same empirical formula but having a higher ratio of aluminum to chloride than exists in the starting material.

5. The method of claim 4 in which the starting aluminum compound has the empirical formula $$Al_3(OH)_6Cl_3$$

6. The method of claim 4 in which the starting aluminum compound has the empirical formula $$Al_4(OH)_9Cl_3$$

References Cited

UNITED STATES PATENTS

| | | | |
|---|---|---|---|
| 2,791,486 | 5/1957 | Appell | 167—90 X |
| 2,823,144 | 2/1958 | Dalton | 260—448 X |
| 2,823,169 | 2/1958 | Brown et al. | 167—90 |
| 2,872,379 | 2/1959 | Neumann et al. | 167—90 |
| 3,359,169 | 12/1967 | Slater et al. | 167—90 |
| 3,420,932 | 1/1969 | Jones et al. | |

TOBIAS E. LEVOW, Primary Examiner

H. M. S. SNEED, Assistant Examiner

U.S. Cl. X.R.

424—68; 23—52, 92

UNITED STATES PATENT OFFICE
CERTIFICATE OF CORRECTION

Patent No. 3,523,129                  Dated August 4, 1970

Inventor(s) James M. Holbert, Stewart M. Beekman & Horst W. Schmank

It is certified that error appears in the above-identified patent and that said Letters Patent are hereby corrected as shown below:

Col. 2, line 56,
"$Al_4(OH)_6$" should read --$Al_4(OH)_9$--.

Col. 2, line 58,
"$Al(OH)$" should read --$Al_4(OH)$--

Signed and sealed this 17th day of August 1971.

(SEAL)
Attest:

EDWARD M. FLETCHER, JR.　　　　　　　WILLIAM E. SCHUYLER, JR.
Attesting Officer　　　　　　　　　　Commissioner of Patents